UNITED STATES PATENT OFFICE.

ARNOLD S. WAHL, OF CHICAGO, ILLINOIS.

PROCESS FOR FINISHING BREAD AND THE LIKE.

1,155,530.  Specification of Letters Patent.  Patented Oct. 5, 1915.

No Drawing.  Application filed March 22, 1915.  Serial No. 16,210.

*To all whom it may concern:*

Be it known that I, ARNOLD S. WAHL, a citizen of the United States, residing at Chicago, in the county of Cook and State of Illinois, have invented a new and useful Improvement in the Process for Finishing Bread and the like, of which the following is a specification.

I have discovered that, after bread has been baked, and while it is cooling, it absorbs a considerable volume of gas from the atmosphere in which it rests. The probable causes for this absorption can readily be found. In the first place, the actual physical condensation of the gas in the pores, which occurs as its temperature falls, produces a partial vacuum and draws in gas from the atmosphere. Secondly, the gas in bread and most similar products is carbon dioxid which is readily soluble in water, its solubility increasing as the temperature falls. The tendency therefore is for this gas to be dissolved in the free water which forms a considerable part of the bread, and the vacuum is evidently accentuated in this manner. I am led to believe that there is also a chemical combination, which takes place between the carbon dioxid and the nitrogenous matter of the bread, similar in general character to that which occurs between carbon dioxid and generally similar nitrogenous substances in beer, and such action would have a tendency similarly to accentuate the formation of the vacuum. However, whatever the causes of this' vacuum, it clearly exists, with the obvious result of drawing into the pores of the bread or similar product a considerable quantity of gas from the surrounding atmosphere. The broadest feature of my invention consists in surrounding the bread during its cooling with an atmosphere containing, in gaseous or vaporous form, such materials as it may be desired to add to the bread in the finishing thereof.

As an example of the results which may be accomplished by the use of my invention in its broadest form, I will state that I have cooled the bread in an atmosphere containing the vapor of amyl butyrate with the result that the bread absorbed a considerable quantity of the vapor and thus received a distinct and very desirable flavor of banana. It will be observed that in this manner it is possible to introduce volatile flavors which would be entirely dissipated under the baking heat and yet which will thoroughly impregnate the loaf and impart their desirable properties when introduced in this manner.

As a more specific embodiment of my broad invention, I have discovered that if the bread be cooled in an atmosphere of carbon dioxid, the bread is thereby so modified as not to become stale, but on the contrary, remains fresh for a long time after baking. A very considerable quantity of carbon dioxid is absorbed in this manner, some doubtless remaining in gaseous form in the pores of the bread, while a considerably greater quantity undoubtedly is dissolved by the water present, so that the body of water in the bread presently becomes saturated with carbon dioxid. There seems also to be a distinct chemical reaction between the carbon dioxid and some of the nitrogenous substances of the bread. Whatever may be the exact nature of this chemical reaction, the result is as stated, and the bread not only has imparted to it a very desirable flavor, but remains fresh for a very long time. I am led to believe, from my experience, that this desirable result is caused in part by the action of the carbon dioxid, and in part by the exclusion of oxygen which is normally drawn into the bread in a similar manner from the air. The undesirable effects of oxygen upon the flavor of delicate nitrogenous foods has been fully demonstrated in the brewing industry, and my experience leads me to believe that bread becomes stale largely by reason of the oxidation caused by the drawing in of air.

Aside from the negative function of excluding oxygen, carbon dioxid is the preferred gas, not only because I believe it enters into and forms desirable chemical compounds, but also because, owing to its ready solubility in water, a relatively large quantity of carbon dioxid can be absorbed, and the use of this gas therefore tends to prolong the period before which any oxygen will enter the loaf by diffusion. I prefer also to employ that form of carbon dioxid which it has been determined, by long experience in brewing, is best suited to combine with nitrogenous food substances, that is to say, carbon dioxid freshly produced by fermentation. This carbon dioxid has the further advantage of carrying with it the delicate aromas of fermentation and imparting to the bread a very desirable flavor.

The finishing process can be carried out with any apparatus whatever, any sort of a chamber or receptacle, filled with the selected atmosphere, being suitable. I realize that considerable variation is possible in the details of the process herein shown, and I do not intend to limit myself thereto, except as pointed out in the following claims, in which it is my intention to claim all the novelty inherent in the process as broadly as is permitted by the state of the art.

What I claim as new and desire to secure by Letters Patent is:

1. The herein described process of finishing bread and the like, which consists in surrounding the same while cooling, after baking, with a predetermined atmosphere containing substances which it is desired to add.

2. The herein described process of finishing bread and the like, which consists in surrounding the same while cooling, after baking, with a predetermined atmosphere containing proper constituents for absorption, whereby the bread or the like absorbs into its pores the desired ingredients.

3. The herein described process of finishing bread and the like, which consists in surrounding the same while cooling, after baking, with an atmosphere free from oxygen.

4. The herein described process of finishing bread and the like, which consists in surrounding the same while cooling, after baking, with an atmosphere of carbon dioxid.

5. The herein described process of finishing bread and the like, which consists in surrounding the same while cooling, after baking, with an atmosphere of carbon dioxid produced by fermentation.

6. The herein described process of finishing bread and the like, which consists in surrounding the same while cooling, after baking, with an atmosphere of carbon dioxid freshly produced by fermentation.

7. The herein described process of finishing bread and the like, which consists in surrounding the same while cooling, after baking, with an atmosphere of carbon dioxid containing in addition a flavoring material.

In testimony whereof I have hereunto affixed my hand this 20th day of March, A. D. 1914.

ARNOLD S. WAHL.

In presence of two subscribing witnesses:
A. C. FISCHER,
L. HEISLAR.